United States Patent [19]

Tanahashi et al.

[11] Patent Number: 4,945,867
[45] Date of Patent: Aug. 7, 1990

[54] TWO-STROKE ENGINE

[75] Inventors: Toshio Tanahashi; Masanobu Kanamaru; Yushiro Yasuda; Masahiko Masubuchi; Toshio Ito; Kazuhiro Itoh, all of Susono, Japan

[73] Assignee: Toyota Jidosha Kabushiki Kaisha, Japan

[21] Appl. No.: 391,786

[22] Filed: Aug. 9, 1989

[30] Foreign Application Priority Data

| Aug. 12, 1988 | [JP] | Japan | 63-200035 |
| Aug. 29, 1988 | [JP] | Japan | 63-212403 |
| Aug. 30, 1988 | [JP] | Japan | 63-112780[U] |
| Aug. 31, 1988 | [JP] | Japan | 63-214942 |
| Oct. 7, 1988 | [JP] | Japan | 63-251991 |

[51] Int. Cl.$^5$ ............................................. F02B 75/02
[52] U.S. Cl. ................................. 123/65 VD; 123/432
[58] Field of Search .............. 123/65 VD, 432, 308, 123/193 H

[56] References Cited

U.S. PATENT DOCUMENTS

| 2,292,233 | 8/1942 | Lysholm | 123/316 |
| 2,522,921 | 7/1950 | Barkeij | 123/309 |
| 2,768,617 | 10/1956 | Tierney et al. | 123/306 |
| 3,993,037 | 11/1976 | Mukai et al. | 123/432 |
| 4,162,662 | 7/1979 | Melchoir | 123/65 VD |
| 4,340,147 | 6/1989 | Tanahashi et al. | 123/65 VD |
| 4,732,117 | 3/1988 | Tanahashi | 123/65 VD |
| 4,732,124 | 3/1988 | Nakamura et al. | 123/302 |

FOREIGN PATENT DOCUMENTS

| 63-201312 | 8/1988 | Japan . |
| 277875 | 3/1927 | United Kingdom . |

Primary Examiner—E. Rollins Cross
Attorney, Agent, or Firm—Oliff & Berridge

[57] ABSTRACT

A two-stroke engine including a pair of intake valves which are symmetrically arranged with respect to a symmetrical plane including the axis of the cylinder. A masking wall is provided for each intake valve to mask the valve opening between the valve seat and the peripheral portion of the intake valve, which is located on the exhaust valve side, for the entire time for which the intake valve is open. These masking walls are also symmetrically arranged with respect to the symmetrical plane.

37 Claims, 18 Drawing Sheets

TWO-STROKE ENGINE

BACKGROUND OF THE INVENTION

1. Field of the Invention

The present invention relates to a two-stroke engine.

2. Description of the Related Art

To obtain a good loop scavenging operation in the combustion chamber of a known two-stroke diesel engine, a masking wall is provided for masking the valve opening between the valve seat and the peripheral portion of the intake valve, which is located on the cylinder axis side, and, at the same time, masking the valve opening between the valve seat and the peripheral portion of the exhaust valve, which is located on the cylinder axis side, when the valve lifts of the intake valve and the exhaust valve are small. The intake port and the exhaust port are arranged to extend upward in parallel to the cylinder axis (U.S. Pat. No. 4162662). In this two-stroke diesel engine, air flowing into the combustion chamber from the intake port flows toward the top face of the piston along the inner wall of the cylinder. Subsequently, the flow direction of the air on the top face of the piston is changed, and the air then made to flow toward the exhaust port along the inner wall of the cylinder, to thereby carry out a loop scavenging operation.

In this two-stroke diesel engine, however, when the valve lifts of the intake valve and the exhaust valve become large, the valve opening between the intake valve and the valve seat is open to the combustion chamber over the entire periphery of the intake valve, and the valve opening between the exhaust valve and the valve seat is open to the combustion chamber over the entire periphery of the exhaust valve. As a result, air flowing into the combustion chamber from the valve opening of the intake valve, which is located on the cylinder axis side, moves forward along the inner wall of the cylinder head and is then discharged into the exhaust port via the valve opening of the exhaust valve. Consequently, in this two-stroke diesel engine, since a part of the air fed from the intake port must be used to ensure an effective loop scavenging operation, a problem occurs in the engine in that a good scavenging operation cannot be obtained.

SUMMARY OF THE INVENTION

An object of the present invention is to provide a two-stroke engine in which a good scavenging operation is obtained.

According to the present invention, there is provided a two-stroke engine include: an engine body including a cylinder and a cylinder head which has an inner wall; a piston reciprocally movable in the engine body, the inner wall of the cylinder head and a top face of the piston defining a combustion chamber therebetween; a pair of intake ports formed in the cylinder head and symmetrically arranged with respect to a symmetrical plane which includes an axis of the cylinder; a pair of intake valves symmetrically arranged on the inner wall of the cylinder head with respect to the symmetrical plane and having substantially the same shape; exhaust valve means arranged on the inner wall of the cylinder head; and a pair of masking walls each being formed on the inner wall of the cylinder head and arranged between the corresponding intake valve and the exhaust valve means to mask a valve opening formed between a valve seat and a peripheral portion of the corresponding intake valve, which is located on the exhaust valve means side, for the entire time for which the corresponding intake valve is open, the masking walls being symmetrically arranged with respect to the symmetrical plane and having substantially the same shape.

The present invention may be more fully understood from the description of preferred embodiments of the invention set forth below, together with the accompanying drawings.

DESCRIPTION OF THE PREFERRED EMBODIMENTS

Figure 1:
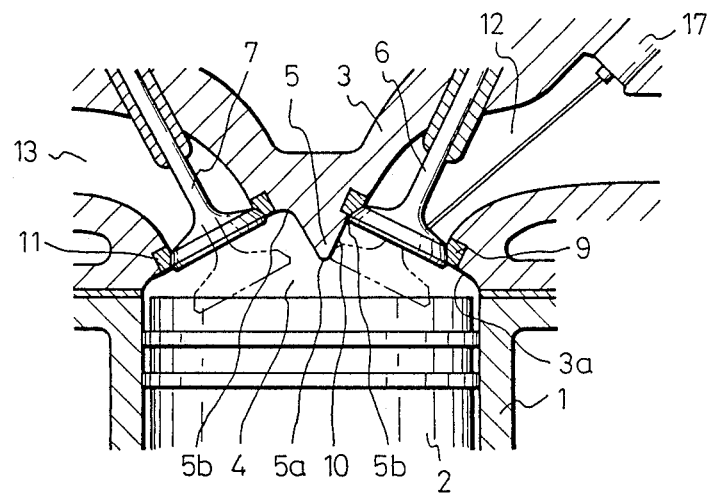
FIG. 1 is a cross-sectional side view of a two-stroke engine.
Figure 2:
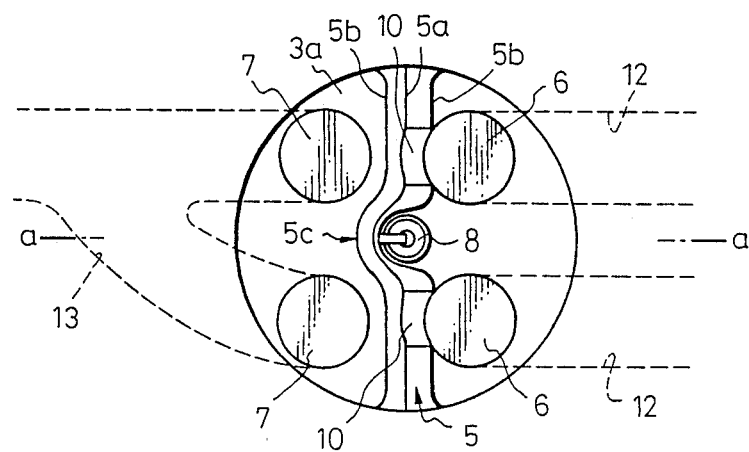
FIG. 2 is a view illustrating the inner wall of the cylinder head.
Figure 3:
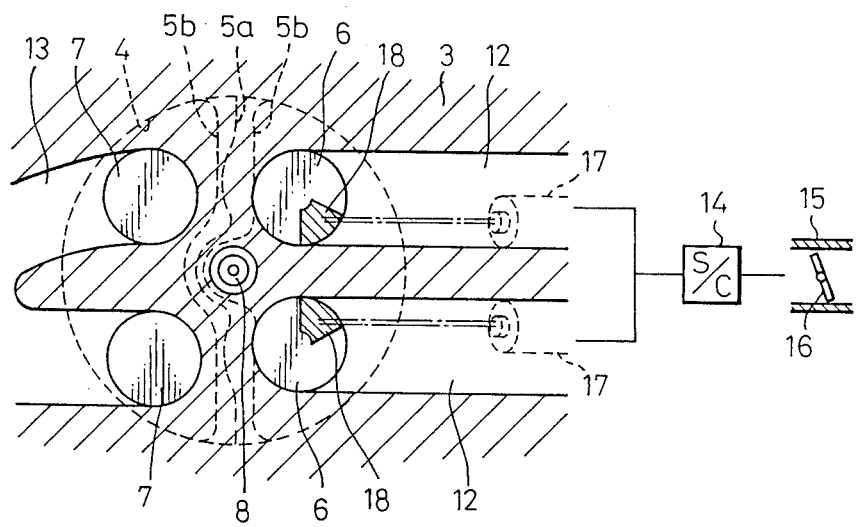
FIG. 3 is a cross-sectional plan view of the cylinder head.

Referring to FIGS. 1 through 3, reference numeral 1 designates a cylinder block, 2 a piston reciprocally movable in the cylinder block 1, 3 a cylinder head fixed onto the cylinder block 1, and 4 a combustion chamber formed between the inner wall 3a of the cylinder head 3 and the top face of the piston 2. A raised portion 5 projecting toward the combustion chamber 4 is formed on and extends along the entire length of the diameter of the inner wall 3a of the cylinder head 3. As illustrated in FIG. 1, the raised portion 5 has a substantially triangular cross-section having a ridge 5a at the lower end thereof. The root portions of the raised portion 5 are indicated by reference numerals 5b in FIGS. 1 through 3. A pair of intake valves 6 are arranged on one side of the raised portion 5, and a pair of exhaust valves 7 are arranged on the other side of the raised portion 5.

The raised portion 5 has a central portion 5c formed as an arc facing the exhaust valves 7, and a spark plug 8 is arranged on the intake valve side of the central arc portion 5c. Consequently, the spark plug 8 is located approximately on the cylinder axis on the intake valve side of the raised portion 5. Masking walls 10 are formed on the raised portion 5 for each intake valve 6 to mask the valve opening between the valve seat 9 and the peripheral portion of the intake valve 6, which is located on the exhaust valve side. These masking walls 10 are arranged as close as possible to the peripheral portions of the corresponding intake valves 6 and have an arc-shaped cross-section which extends along the peripheral portion of the corresponding intake valve 6. In addition, these masking walls 10 extend toward the combustion chamber 4 to a position lower than the intake valves 6 which are in the maximum lift position illustrated by the dashed-dotted line in FIG. 1. Consequently, the valve opening between the valve seat and the peripheral portion of the intake valve 6, which is located on the exhaust valve side, is masked by the corresponding masking wall 10 for the entire time for which the intake valve 6 is open. A fixed space exists between the peripheral portions of the exhaust valves 7 and the root portion 5b of the raised portion 5, and thus the valve opening between a valve seat 11 and the peripheral portion of the exhaust valve 7, which is located on the intake valve side, is not masked by the raised portion 5. Consequently, when the exhaust valve 7 opens, the valve opening between the valve seat 11 and the exhaust valve 7 is open to the combustion chamber 4 over the entire periphery of the exhaust valve 7.

Intake ports 12 are formed in the cylinder head 3 for the intake valves 6, and an exhaust port 13 is formed in the cylinder head 3 for the exhaust valves 7. The intake ports 12 are connected to the air cleaner (not shown) via, for example, a mechanically driven supercharger 14 driven by the engine and via an intake duct 15, and a throttle valve 16 is arranged in the intake duct 15. Fuel injectors 17 are arranged on the upper walls of the intake ports 12, and fuel having a small spread angle is injected in the form of a bar-like shape from the fuel injectors 17 toward the hatching areas 18 of the intake valves 6, as illustrated in FIG. 3. These hatching areas 18 are located on the spark plug side of the axes of the intake ports 12 and located on the opposite side of the spark plug 8 with respect to the line passing through the valve stems of both intake valves 6.

As can be seen from FIG. 2, the intake valves 6 are symmetrically arranged with respect to the symmetrical plane a—a including the axis of the cylinder. The intake ports 12 are also symmetrically arranged with the plane a—a. In addition, the intake valves 6 have substantially the same shape, and the intake ports 12 have substantially the same shape. Furthermore, the valve lift curves of the two intake valves 6 are substantially the same. Consequently, when the intake valves 6 are open, the amount of fresh air flowing into the combustion chamber 4 from one of the intake ports 12 becomes substantially the same as that of fresh air flowing into the combustion chamber 4 from the other intake port 12. In addition, the raised portion 5 has a symmetrical shape with respect to the plane a—a, and the masking walls 10 are symmetrically arranged with respect to the plane a—a. Furthermore, the masking walls 10 have substantially the same shape. The exhaust valves 7 are also symmetrically arranged with the plane a—a and have substantially the same shape.

Figure 4:
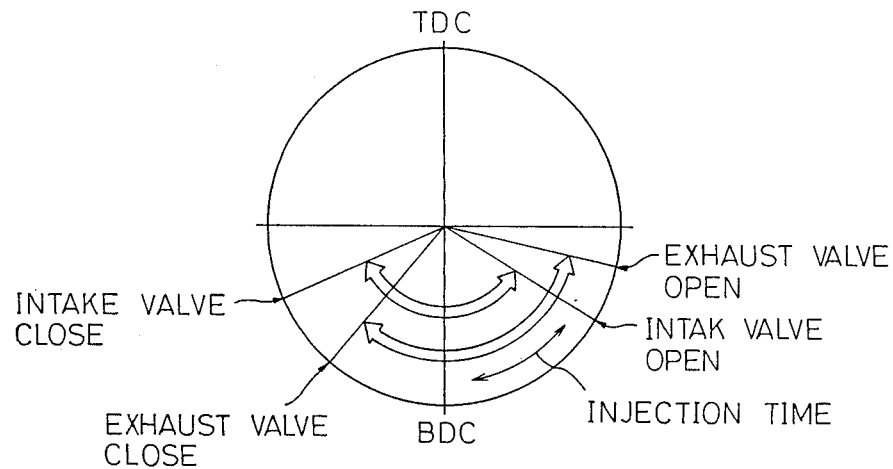
FIG. 4 is a diagram illustrating the opening time of the intake valve and the exhaust valve.

FIG. 4 illustrates an example of the opening time of the intake valves 6 and the exhaust valves 7 and an example of the injection time. In the example illustrated in FIG. 4, the exhaust valves 7 open earlier than the intake valves 6, and the exhaust valves 7 close earlier than the intake valves 6. In addition, the fuel injection is set to occur at a time after the intake valves 6 open and before the piston 2 reaches bottom dead center BDC.

Figure 5:
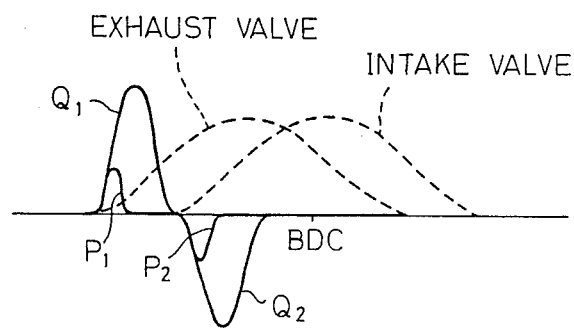
FIG. 5 is a diagram illustrating the valve lift of the intake valve and the exhaust valve and illustrating a change in pressure in the exhaust port.

FIG. 5 illustrates the valve lifts of the intake valves 6 and the exhaust valves 7 and illustrates changes in pressures $P_1$, $P_2$, $Q_1$, $Q_2$ in the exhaust port 13. The changes in pressures $P_1$, $P_2$, $Q_1$, $Q_2$ will be hereinafter described.

Figure 6A:
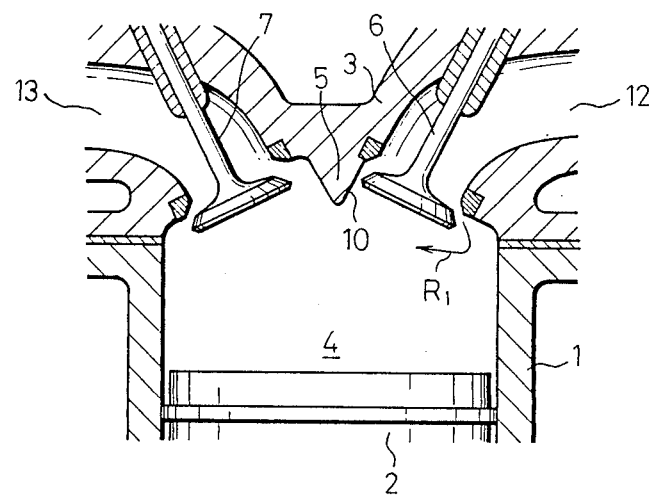
FIG. 6A and 6B are cross-sectional side views of the engine, illustrating the operation of the engine when under a light load.
Figure 6B:
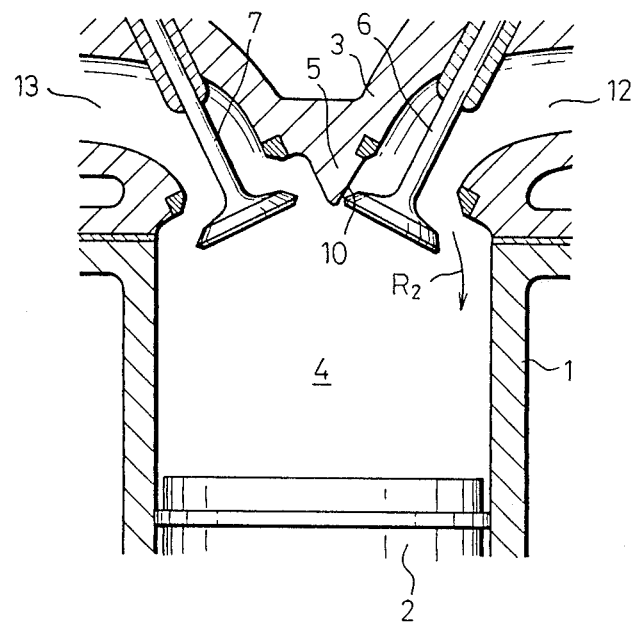
Figure 7A:
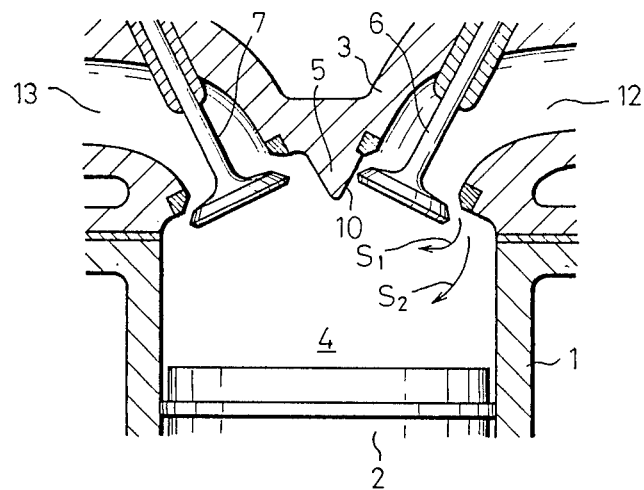
FIGS. 7A and 7B cross-sectional side views of the engine, illustrating the operation of the engine when under a heavy load.
Figure 7B:
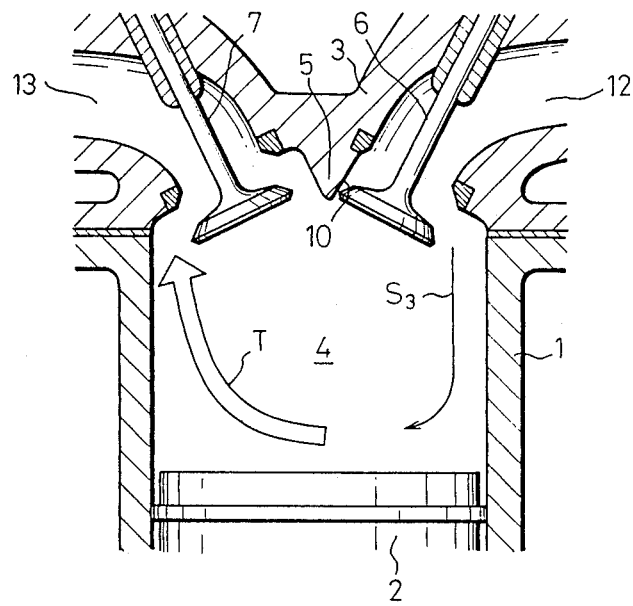

Next, the scavenging operation and the stratifying operation will be described with reference to FIGS. 6 and 7. FIG. 6 illustrates a state where the engine is operating under a light load, and FIG. 7 illustrates a case where the engine is operating under a heavy load. In addition, FIGS. 6(A) and 7(A) illustrate a moment immediately after the intake valves 6 open, and FIGS. 6(B) and 7(B) illustrate a moment when the piston 2 is approximately at bottom dead center BDC.

The scavenging operation and the stratifying operation under a light load operation of the engine will be first described with reference to FIG. 6.

When the piston 2 moves downward, and the exhaust valves 7 open, burned gas under a high pressure in the combustion chamber 4 flows out into the exhaust port 13, and thus the pressure in the exhaust port 13 becomes temporarily positive, as illustrated by $P_1$ in FIG. 5. This positive pressure $P_1$ propagates in the exhaust passage in the downstream direction thereof and is reflected at the joining portion of the exhaust passages for each cylinder. Subsequently, the thus reflected pressure is again propagated toward the exhaust port 13 in the form of a vacuum pressure. Consequently, when the intake valves 6 open, the vacuum pressure is produced in the exhaust port 13, as illustrated by $P_2$ in FIG. 5. The timing at which the vacuum pressure $P_2$ is produced depends on the length of the exhaust passage. When the engine is operating under a light load, the combustion pressure is low, and thus the positive pressure $P_1$ and the vacuum pressure $P_2$ produced in the exhaust port 13 are relatively small.

When the intake valves 6 open, fresh air containing fuel therein is fed into the combustion chamber 4 from the intake ports 12. At this time, since the masking walls 10 are provided for the valve openings of the intake valves 6, the fresh air and the fuel flow mainly into the combustion chamber 4 from portions of the valve openings of the intake valves 6, which portions are located on the opposite side with respect to the masking walls 10. In addition, when the intake valves 6 open, since the vacuum pressure is produced in the exhaust port 13, as illustrated by $P_2$ in FIG. 5, the burned gas positioned at the upper portion of the combustion chamber 4 is sucked out into the exhaust port 13 due to this vacuum pressure. At this time, as illustrated by the arrow $R_1$ in FIG. 6(A), the fresh air and the fuel is pulled toward the exhaust valves 7 due to the movement of the burned gas, and thus the fuel is introduced into a space around the spark plug 8 (FIG. 2). Then, when the piston 2 moves further downward, as illustrated in FIG. 6(B), the fresh air containing the fuel therein flows downward along the inner wall of the cylinder beneath the intake valves 6, as illustrated by the arrow $R_2$ in FIG. 6(B). But, when the engine is operating under a light load, the amount of fresh air fed into the combustion chamber 4 is small, and in addition, the velocity of the fresh air flowing into the combustion chamber 4 is low. As a result, the fresh air does not reach the top face of the piston 2 but stays at the upper portion of the combustion chamber 4, and consequently, when the piston 2 moves upward, since the air-fuel mixture has collected at the upper portion of the combustion chamber 4, and the residual unburned gas has collected at the lower portion of the combustion chamber 4, the interior of the combustion chamber 4 is stratified, and thus the air-fuel mixture is properly ignited by the spark plug 8.

When the engine is operating under a heavy load, since the combustion pressure becomes high, the positive pressure produced in the exhaust port 13 also becomes high, as illustrated by $Q_1$ in FIG. 5, and in addition, the vacuum pressure produced by the reflection of the positive pressure $Q_1$ becomes great, as illustrated by $Q_2$ in FIG. 5. Furthermore, the peak of the vacuum pressure $Q_2$ occurs a short interval after the production of the positive pressure $P_2$.

When the engine is operating under a heavy load, the amount of fresh air fed into the combustion chamber 4 is large, and the velocity of the fresh air flowing into the combustion chamber 4 becomes high. Consequently, when the intake valves 6 open, a large amount of the fresh air containing the fuel therein flows into the combustion chamber 4 at a high speed. Subsequently, when the burned gas positioned at the upper portion of the combustion chamber 4 is sucked into the exhaust port 13, due to the production of the vacuum pressure $Q_2$ in the exhaust port 13, the direction of flow of the fresh air is changed toward the central portion of the combustion chamber 4 as illustrated by the arrows $S_1$ and $S_2$ in FIG. 7(A). Then, when the piston 2 moves further downward, the fresh air flows downward along the inner wall of the cylinder beneath the intake valves 6 and reaches the top face of the piston 2, as illustrated by $S_3$ in FIG. 7(B). Consequently, the burned gas in the combustion chamber 4 is gradually pushed out by the fresh air and discharged into the exhaust port 13, as illustrated by the arrow T in FIG. 7(B), and thus a loop scavenging operation is realized in the combustion chamber 4.

When the intake valves 6 are open, if the amount of fresh air flowing into the combustion chamber 4 from one of the intake port 12 is different from that of fresh air flowing into the combustion chamber 4 from the other intake port 12, that is, if the strength of the stream of fresh air flowing into the combustion chamber 4 from one of the intake port 12 is different from that of the stream of fresh air flowing into the combustion chamber 4 from the other intake port 12, since the weaker fresh air stream is pushed laterally by the stronger fresh air stream, the fresh air cannot flow along a well formed loop, and thus a good loop scavenging operation cannot be obtained as a whole.

However, as mentioned above, in the embodiment illustrated in FIGS. 1 through 3, the intake valves 6, the masking walls 10, and the intake ports 12 are symmetrically arranged with respect to the plane a—a and have substantially the same shape. Consequently, since the strength of the stream of fresh air flowing into the combustion chamber 4 from one of the intake ports 12 is substantially the same as that of the stream of fresh air flowing into the combustion chamber 4 from the other intake port 12 and, in addition, the combustion chamber 4 has a symmetrical shape with respect to the plane a—a, the fresh air flowing into the combustion chamber 4 from the intake ports 12 causes loop shaped streams which are symmetrical with respect to the plane a—a. As a result, since the fresh air flows along a well formed loop within the combustion chamber 4, a strong loop scavenging operation can be obtained when the engine is operating under a heavy load.

In a two-stroke engine equipped with the above intake valve and exhaust valve arrangement, the most efficient scavenging effect can be obtained by carrying out such a loop scavenging operation. In addition, in such a two-stroke engine, the amount of residual burned gas is large, and to obtain a good ignition and a subsequent good combustion even if the amount of residual burned gas is large, the air-fuel mixture must be collected around the spark plug, i.e., a good stratification must be obtained. In the embodiment illustrated in FIGS. 1 through 3, the provision of the masking walls 10 makes it possible to prevent a flow of fresh air and fuel along the inner wall $3a$ of the cylinder head 3 which then flows out into the exhaust port 13, and as a result, a good scavenging operation and a good stratification can be obtained.

In addition, by arranging the spark plug 8 on the intake valve side of the raised portion 5, the air-fuel mixture tends to collect around the spark plug 8, and thus it is possible to obtain a proper ignition of the air-fuel mixture by the spark plug 8. Particularly, the air-fuel mixture tends to stay within an area surrounded by the central arc portion $5c$ of the raised portion 5, and since the spark plug 8 is arranged in this area, the ignition is thus improved. In addition, since the fuel injected from the fuel injectors 17 is instantaneously fed into the combustion chamber 4 after the fuel impinges upon the rear faces of the valve bodies of the intake valves 6, and is atomized, the fuel will not adhere to the inner walls of the intake ports 12.

Figure 8:
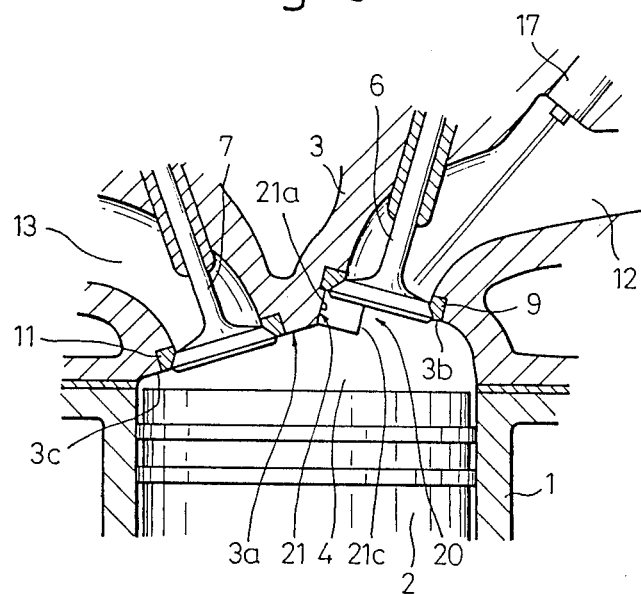
FIG. 8 is a cross-sectional side view of another embodiment of a two-stroke engine.
Figure 9:
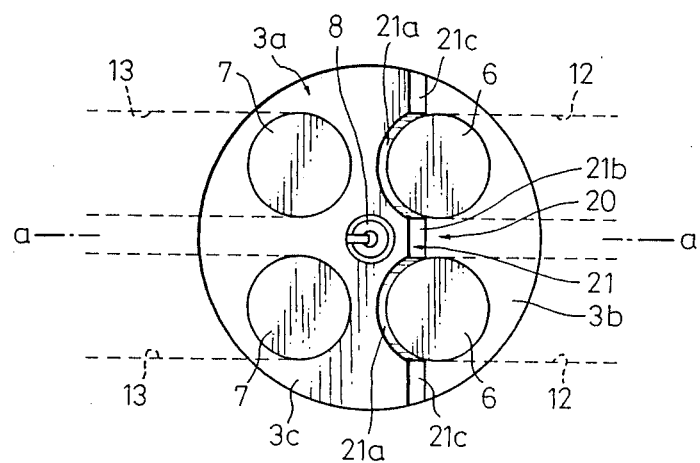
FIG. 9 is a view illustrating the inner wall of the cylinder head of FIG. 8.

FIGS. 8 and 9 illustrate another embodiment of a two-stroke engine, by which an even better loop scavenging operation is obtained. In this embodiment, a depression 20 is formed on the inner wall 3a of the cylinder head 3, and the intake valves 6 are arranged on the inner wall portion 3b of the cylinder head 3, which forms the bottom wall of the depression 20. The inner wall portion 3c of the cylinder head 3 other than the depression 20 is substantially flat, and the exhaust valves 7 are arranged on this inner wall portion 3c of the cylinder head 3. The inner wall portions 3b and 3c of the cylinder head 3 are interconnected via the peripheral wall 21 of the depression 20. The peripheral wall 21 of the depression 20 comprises masking walls 21a arranged as close as possible to the peripheral portions of the corresponding intake valves 6 and extending archwise along the periphery of the corresponding intake valves 6, a fresh air guide wall 21b arranged between the intake valves 6, and fresh air guide walls 21c each arranged between the circumferential wall of the inner wall 3a of the cylinder head 3 and the corresponding intake valve 6. The masking walls 21a extend toward the combustion chamber 4 to a position lower than the intake valves 6 when the valves 6 are in the maximum lift position, and thus the valve opening between the valve seat 9 and the peripheral portion of the intake valve 6, which is located on the exhaust valve side, is masked by the corresponding masking wall 21a for the entire time for which the intake valve 6 is open. The fresh air guide wall 21b and the fresh air guide walls 21c are located on substantially the same plane and extend substantially in parallel to the line passing through the centers of the intake valves 6. The spark plug 8 is arranged on the inner wall portion 3c of the cylinder head 3 in such a manner that it is located at the center of the inner wall 3a of the cylinder head 3.

As can be seen from FIG. 9, also in this embodiment, the intake valves 6 are symmetrically arranged with respect to the plane a—a including the axis of the cylinder, and the intake ports 12 are also symmetrically arranged with the plane a—a. In addition, the intake valves 6 have substantially the same shape, and the intake ports 12 have substantially the same shape. Furthermore, the valve lift curves of both the intake valves 6 are substantially the same. Consequently, when the intake valves 6 are open, the amount of fresh air flowing into the combustion chamber 4 from one of the intake port 12 becomes substantially the same as that of fresh air flowing into the combustion chamber 4 from the other intake port 12. In addition, the masking walls 21a have a symmetrical shape with respect to the plane a—a and the fresh air guide walls 21b and the fresh air guide wall 21c are symmetrically arranged with respect to the plane a—a. Furthermore, the masking walls 21a and the fresh air guide walls 21c have substantially the same shape, respectively. The exhaust valves 7 and the exhaust ports 13 are also symmetrically arranged with the plane a—a and have substantially the same shape respectively.

In this embodiment, the arced masking walls 21a have a peripheral length longer than that of the masking wall 10 illustrated in FIGS. 1 through 3, and thus, at the valve opening between the intake valve 6 and the valve seat 9, one-third of the valve opening, which is located on the exhaust valve side, is masked by the corresponding masking wall 21a, and the fresh air is fed from the unmasked two-thirds of the valve opening, which is located at the opposite side of the exhaust valve 7. In addition, in this embodiment, the fresh air flowing into the combustion chamber 4 from the intake valve 6 is guided by the fresh air guide walls 21b, 21c so as to flow downward along the inner wall of the cylinder. Consequently, in this embodiment, when the intake valves 6 open, a large part of the fresh air flows toward the top face of the piston 2 along the inner wall of the cylinder, as illustrated by the arrow U in FIG. 10, and thus a good loop scavenging operation is carried out.

Figure 10:
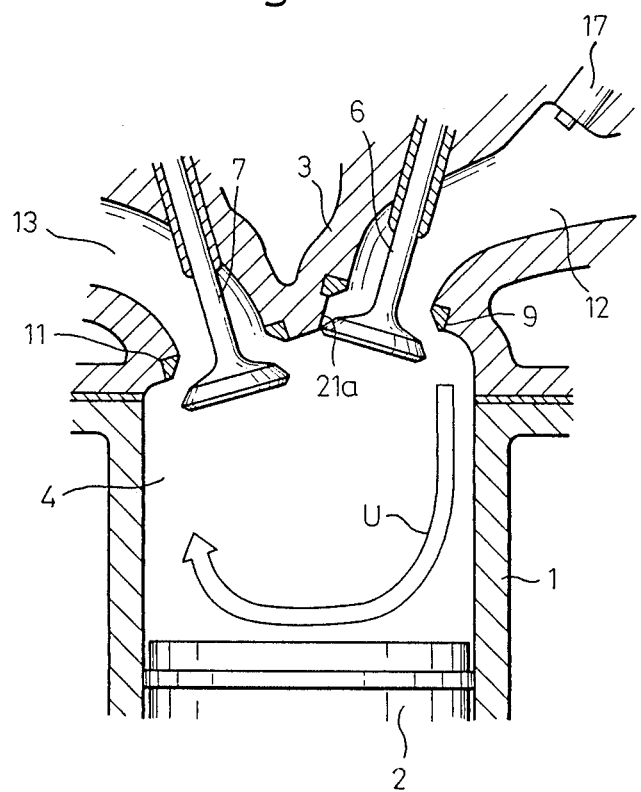
FIG. 10 is a cross-sectional side view of the engine, illustrating the operation of the engine of FIGS. 8 and 9.

Also in the embodiment illustrated in FIGS. 9 and 10, the intake valves 6, the masking walls 21a, the fresh air guide walls 21c and the intake ports 12 are symmetrically arranged with respect to the plane a—a and have substantially the same shape, respectively. Consequently, since the strength of the stream of fresh air flowing into the combustion chamber 4 from one of the intake port 12 is substantially the same as that of the stream of fresh air flowing into the combustion chamber 4 from the other intake port 12 and, in addition, the combustion chamber 4 has a symmetrical shape with respect to the plane a—a, the fresh air flowing into the combustion chamber 4 from the intake ports 12 causes loop shaped streams which are symmetrical with respect to the plane a—a. As a result, since the fresh air flows along a well formed loop within the combustion chamber 4, a strong loop scavenging can be obtained when the engine is operating under a heavy load.

Figure 11:
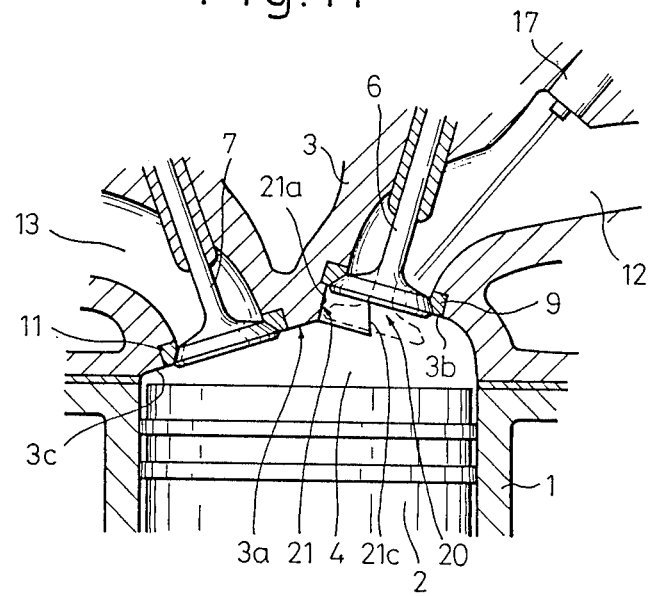
FIG. 11 is a cross-sectional side view of a further embodiment of a two-stroke engine.
Figure 12:
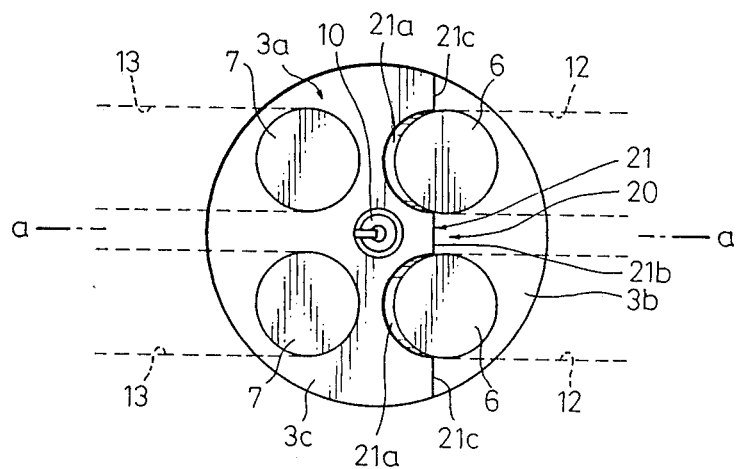
FIG. 12 is a view illustrating the inner wall of the cylinder head of FIG. 11.
Figure 13:
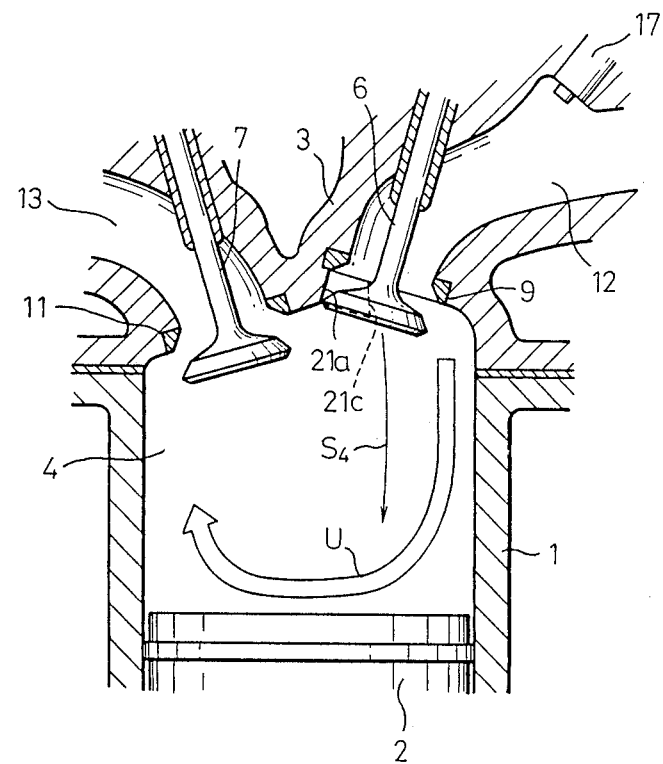
FIG. 13 is a cross-sectional side view of the engine, illustrating the operation of the engine of FIGS. 11 and 12.

FIGS. 11 through 13 illustrate a further embodiment. As can be seen from FIG. 12, also in this embodiment, the intake valves 6, the exhaust valves 7, the intake ports 12, the exhaust ports 13, the masking walls 21a and the fresh air guide walls 21c are symmetrically arranged with respect to the plane a—a and have substantially the same shape, respectively. Also in this embodiment, the fresh air guide walls 21b, 21c extend from the opposed ends of the masking walls 21a at a right angle to the axes of the intake ports 12 in a horizontal plane and face the peripheral portion of the combustion chamber 4 beneath the intake valves 6. In addition, in this embodiment, the fresh air guide walls 21b, 21c are vertically arranged to extend in parallel with the axis of the cylinder.

Consequently, in this embodiment, when the engine is operating under a heavy load, a part of the fresh air fed from the intake valves 6 is guided by the fresh air guide walls 21b, 21c and flows downward along the inner wall of the cylinder beneath the intake valves 6, as illustrated by the arrow $S_4$ in FIG. 13. Then, the flow direction of this part of the fresh air is changed on the top face of the piston 4, and thus this part of the fresh air flows in the form of a loop. Therefore, in this embodiment, since the entire fresh air is caused to flow in the form of a loop, it is possible to further improve the scavenging operation.

Figure 14:
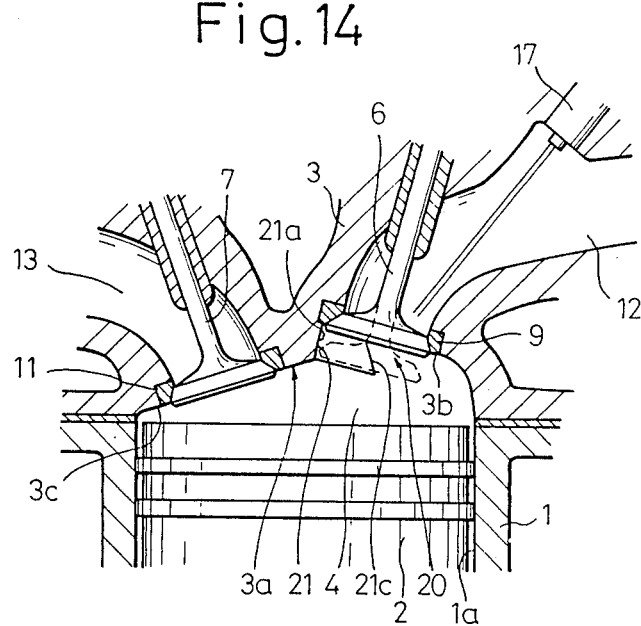
FIG. 14 is a cross-sectional side view of a still further embodiment of a two-stroke engine.
Figure 15:
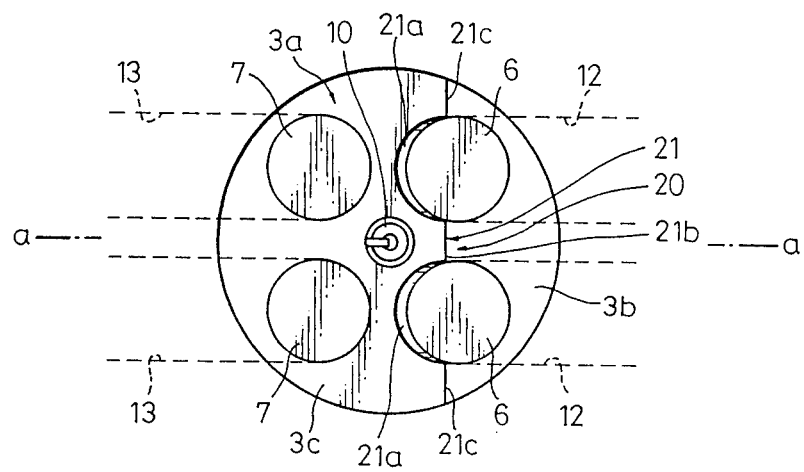
FIG. 15 is a view illustrating the inner wall of the cylinder head of FIG. 14.
Figure 16:
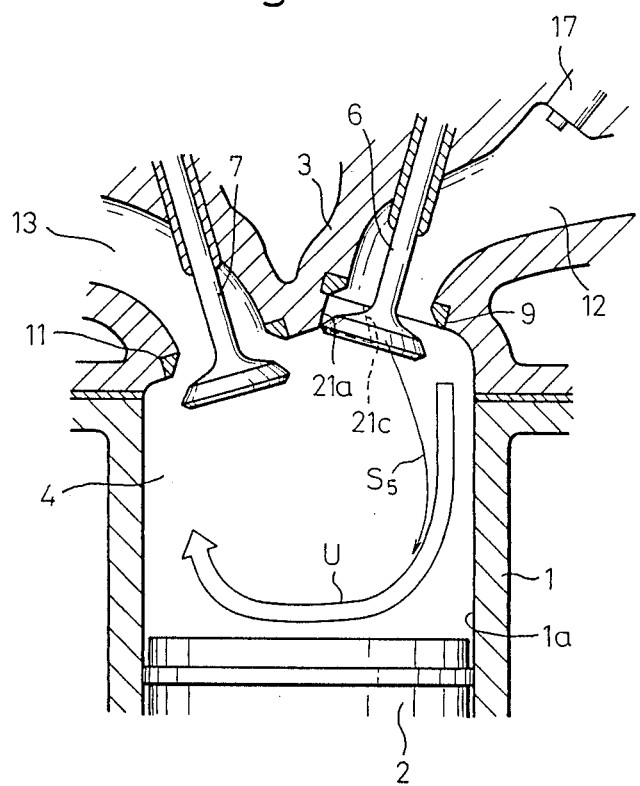
FIG. 16 is a cross-sectional side view of the engine, illustrating the operation of the engine of FIGS. 14 and 15.

FIG. 14 through 16 illustrate a still further embodiment. As can be seen from FIG. 15, also in this embodiment, the intake valves 6, the exhaust valves 7, the intake ports 12, the exhaust ports 13, the masking walls 21a, and the fresh air guide walls 21c are symmetrically arranged with respect to the plane a—a and have substantially the same shape, respectively. In this embodiment, the fresh air guide walls 12b, 12c are inclined so as to extend toward the inner wall 1a of the cylinder beneath the intake valves 6. Consequently, in this embodiment when the engine is operating under a heavy load, a port of the fresh air fed from the intake valves 6 is guided by the fresh air guide walls 21b, 21c and flows toward the inner wall 1a of the cylinder beneath the intake valves 6, as illustrated by the arrow $S_5$ in FIG. 16. Therefore, in this embodiment, since the fresh air stream $S_5$ approaches the inner wall 1a of the cylinder beneath the intake ports 6, a further strong loop scavenging operation can be obtained.

In the embodiments hereinbefore described, the fresh air guide walls 8b, 8c21b, 21c have a flat face, but may be formed so that they have a concavely curved surface having a arch shaped vertical cross-section.

Figure 17:
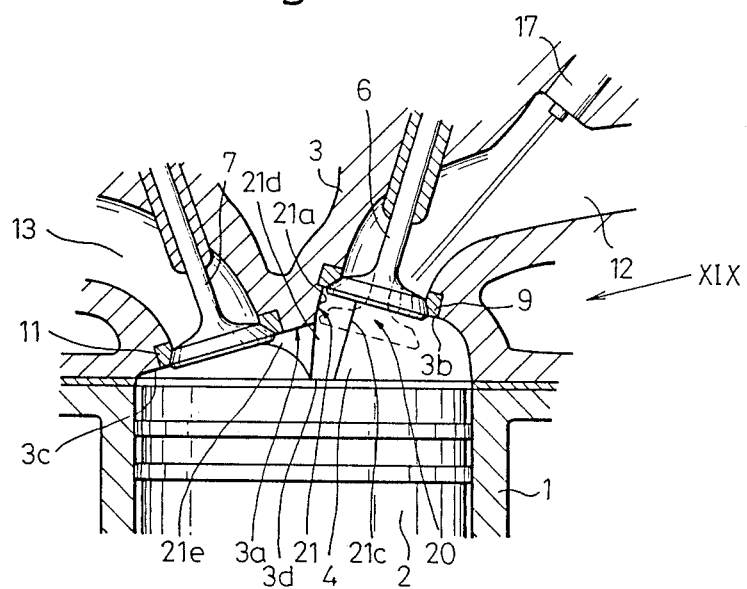
FIG. 17 is a cross-sectional side view of a still further embodiment of a two-stroke engine.
Figure 18:
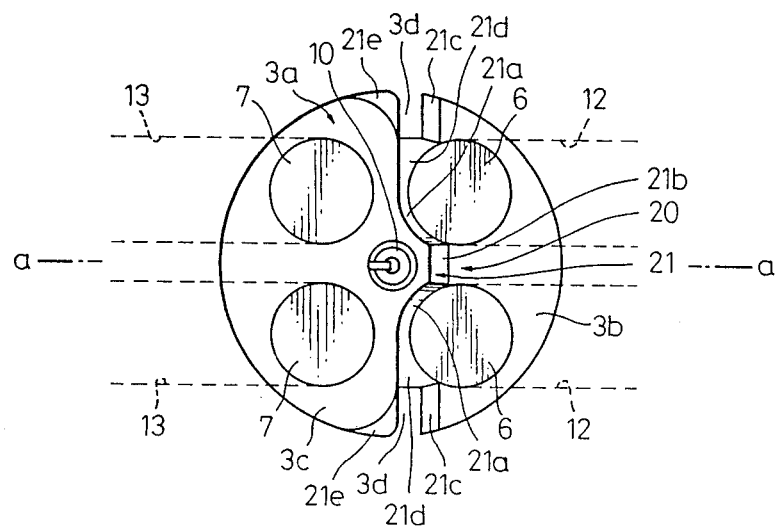
FIG. 18 is a view illustrating the inner wall of the cylinder head of FIG. 17.
Figure 19:
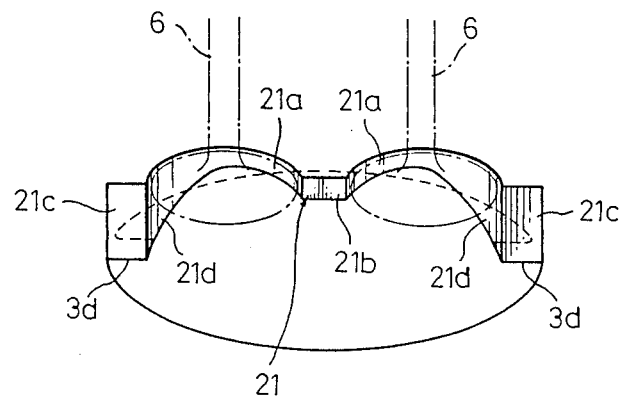
FIG. 19 is a schematically illustrated perspective view of the cylinder head, looking along the arrow XIX in FIG. 17.

FIGS. 17 through 20 illustrate a still further embodiment. As can be seen from FIG. 18, also in this embodiment, the intake valves 6, the exhaust valves 7, the intake ports 12, the exhaust ports 13, the masking walls 21a, and the fresh air guide walls 21c are symmetrically arranged with respect to the plane a—a and have substantially the same shape, respectively. Also in this embodiment, the fresh air guide walls 21b, 21c extend from the opposed ends of the masking walls 21a at a right angle to the axes of the intake ports 12 in a horizontal plane. In addition, in this embodiment, the fresh air guide walls 12c extend to the lowermost wall of the cylinder head 3. That is, the lowermost wall of the cylinder head 3 has a pair of lowermost wall portions 3d which project into the combustion chamber 4 in the form of a U-shape, and the fresh air guide walls 21c extend from the inner wall portion 3b of the cylinder head 3 to the corresponding lowermost wall portions 3d. Consequently, the fresh air guide walls 21c have a height which is higher than that of the masking walls 21a. The masking walls 21a positioned on the fresh air guide wall 21c side have extending portions 21d which extend to the lowermost wall portions 3d, and these extending portions 21d also form guide walls for fresh air. As can be seen from FIG. 19, the extending portions 21d extend, while curving, to the fresh air guide walls 21c, and the height of the extending portions 21d become high toward the fresh air guide walls 21c. As illustrated in FIGS. 17 and 18, burned gas guide walls 21e are formed at a position opposite to the fresh air guide walls 21c. These burned gas guide walls 21e are formed by curved walls which extend from the inner wall portion 3c of the cylinder head 3 to the lowermost wall portions 3d.

Figure 20:
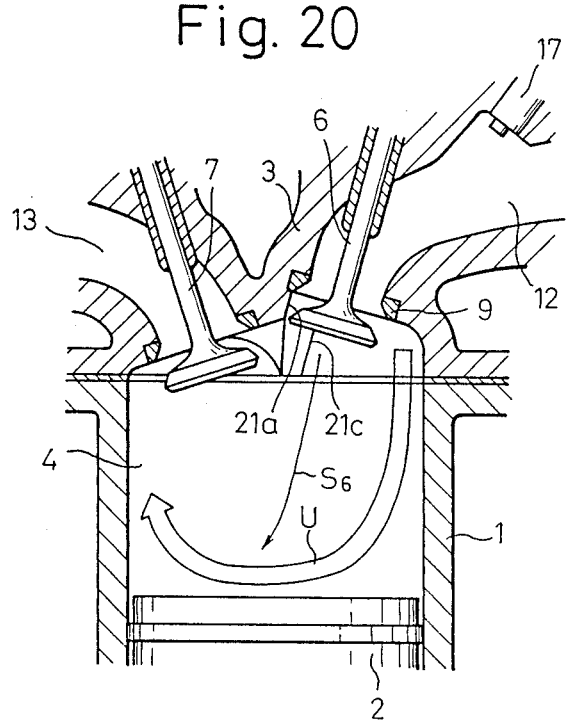
FIG. 20 is a cross-sectional side view of the engine, illustrating the operation of the engine of FIGS. 17 and 18.

In this embodiment, since the fresh air guide walls 8c extend to the lowermost wall portion 3d of the cylinder head 3, when the engine is operating under a heavy load, a part of fresh air fed from the intake valves 6 is guided by the fresh air guide walls 21c and reaches the vicinity of the top face of the piston 2, as illustrated by the arrow $S_6$ in FIG. 20. Consequently, this part of the fresh air serves to scavenge the burned gas in the center of the combustion chamber 4, and thus a good scavenging operation can be obtained. In addition, since the fresh air is also guided by the extending portions 21d, an even better scavenging operation can be obtained.

In addition, since the fresh air is guided by the fresh air guide walls 21c, 21d so that it reaches the vicinity of the top face of the piston 2, even if the positions of the fresh air guide walls 21c are shifted toward the exhaust valves 7, there is no danger that the fresh air escapes into the exhaust ports 13. Consequently, since the positions of the fresh air guide walls 21c can be shifted toward the exhaust valves 7, it is possible to increase the opening area of the intake valves 6. As a result, since the amount of air fed into the combustion chamber 4 can be increased, it is possible to improve the output power of the engine. In addition, when the exhaust valves 7 are open, a part of the burned gas is guided by the burned gas guide walls 21e and smoothly flows out from the combustion chamber 4 into the exhaust ports 13. As a result, since the burned gas is easily discharged from the combustion chamber 4, a good scavenging operation can be obtained.

Figure 21:
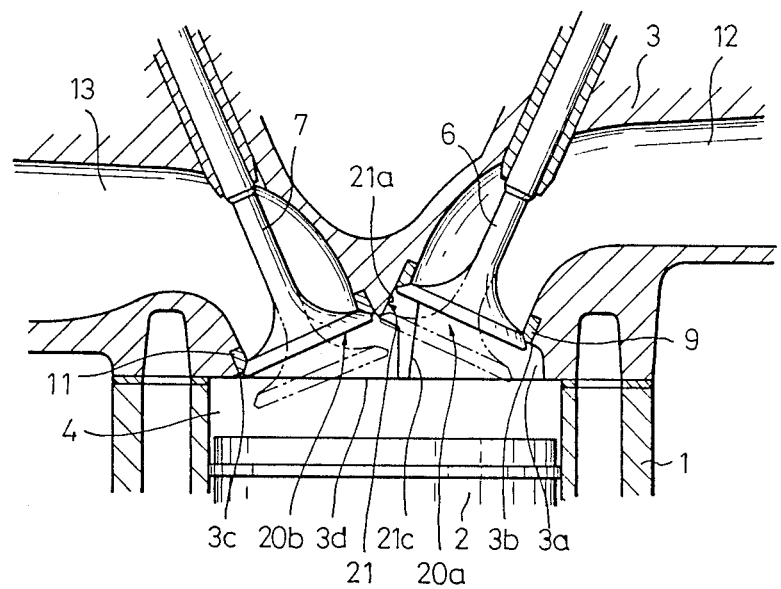
FIG. 21 is a cross-sectional side view of a still further embodiment of a two-stroke engine.
Figure 22:
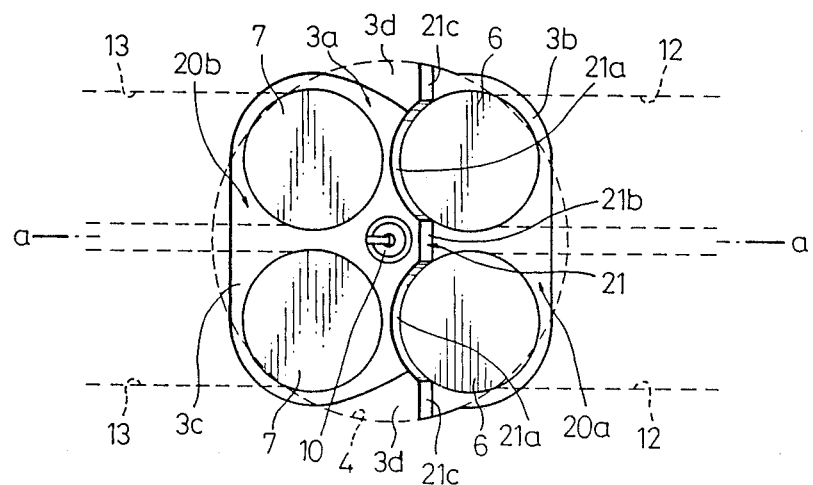
FIG. 22 is a view illustrating the inner wall of the cylinder head of FIG. 21.
Figure 23:
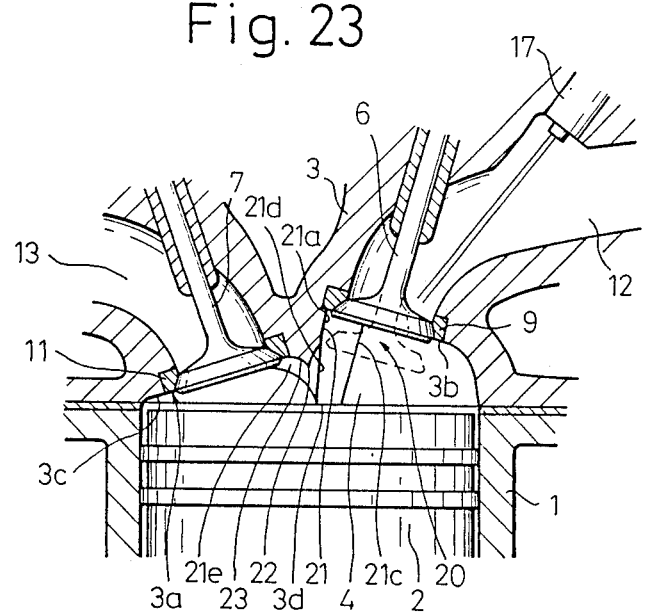
FIG. 23 is a cross-sectional side view of a still further embodiment of a two-stroke engine.
Figure 24:
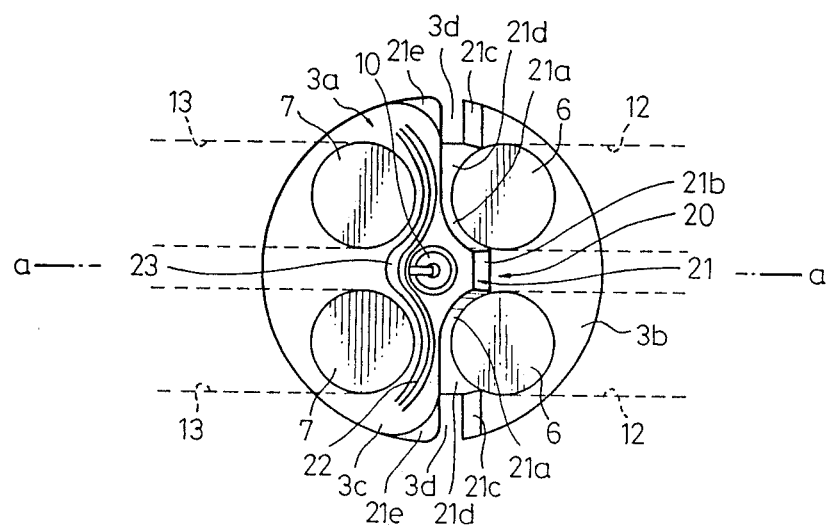
FIG. 24 is a view illustrating the inner wall of the cylinder head of FIG. 23.

FIGS. 21 and 22 illustrate a still further embodiment. As can be seen from FIG. 22, also in this embodiment, the intake valves 6, the exhaust valves 7, the intake ports 12, the exhaust ports 13, the masking walls 21a, and the fresh air guide walls 21c are symmetrically arranged with respect to the plane a—a and have substantially the same shape, respectively.

In this embodiment, a pair of depressions 20a and 20b are formed on the inner wall 3a of the cylinder head 3 so that the depression 20a is generally deeper than the depression 20b. The intake valves 6 are arranged on the inner wall portion 3b of the cylinder head 3, which forms the bottom wall of the depression 20a, and the exhaust valves 7 are arranged on the inner wall portion 3c of the cylinder head 3, which forms the bottom wall of the depression 20b. The intake valves 6 and the exhaust valves 7 are actuated by the cams (not shown). The inclined angle of the inner wall portion 3b is equal to that of the inner wall portion 3c, and thus the inclined angle of the axes of the intake valves 6 is equal to that of the axes of the exhaust valves 7. In addition, in this embodiment, the intake valves 6 have a size and a shape which are substantially the same as those of the exhaust valves 7, and thus the intake valves 6 have a weight and a valve head diameter which are substantially the same as those of the exhaust valves 7. Furthermore, as can be seen from FIG. 22, the intake valves 6 and the exhaust valves 7 are arranged at a point of symmetry.

Also in this embodiment, the lowermost wall of the cylinder head 3 has lowermost wall portions 3d which project into the combustion chamber 4, and the fresh air guide walls 21c extend to the corresponding lowermost wall portions 3d. Consequently, when the engine is operating under a heavy load, a part of the fresh air fed from the intake valves 6 is guided by the fresh air guide walls 21c and reaches the vicinity of the top face of the piston 2.

As mentioned above, in this embodiment, the intake valves 6 have a weight which is substantially the same as that of the exhaust valves 7. This is based on the following reason. That is, in an engine equipped with an intake valve and an exhaust valve which are biased in the closed direction by valve springs and driven by cams, the intake valve and the exhaust valve move away easier from the cams as the engine speed becomes high. To prevent the intake valve and the exhaust valve from moving away from the cams, it is necessary to increase the spring load of the valve springs. That is, the spring load of the valve springs must be increased as the maximum engine speed is increased. In addition, the spring load of the valve springs must be increased as the weights of the intake valve and the exhaust valve are increased. However, in view of the durability of the valve springs, there exists a limitation on the increase in the spring load of the valve springs, and thus the maximum engine speed must be determined so that it becomes low as the weights of the intake valve and the exhaust valve are increased. In this case, if the weight of the intake valve is different from that of the exhaust valve, the maximum engine speed is determined by a heavier valve. There exists a limitation on the mounting space for the intake valve and the exhaust valve in the inner wall of the cylinder head: if the diameter of one of the valves is increased, the diameter of the other valve must be reduced. In this case, the maximum engine speed is determined by the valve having a larger diameter, and thus, in order to maximize the maximum engine speed, the intake valve and the exhaust valve must be formed so that they have substantially the same diameter, i.e., the same weight. Consequently, in the embodiment illustrated in FIGS. 21 and 22, in order to maximize the maximum engine speed, the intake valves 6 have a weight and a diameter which are substantially the same as those of the exhaust valves 7.

FIGS. 23 through 26 illustrate a still further embodiment. As can be seen from FIG. 24, also in this embodiment, the intake valves 6, the exhaust valves 7, the intake ports 12, the exhaust ports 13, the masking walls 21a, and the fresh air guide walls 21c are symmetrically arranged with respect to the plane a—a and have substantially the same shape, respectively.

In this embodiment, a projection 22 having an approximately triangular cross-section is formed on the inner wall portion 3c between the intake valves 6 and the exhaust valves 7, and an exhaust gas guide wall 23 extending from the inner wall portion 3c toward the central portion of the combustion chamber 4 is formed on the projection 22 on the exhaust valve side. As can be seen from FIG. 23, the exhaust gas guide wall 23 has a height which is lower than that of the masking walls 21a and less than one half of the amount of the maximum lift of the exhaust valves 7. As can be seen from FIG. 24, the exhaust gas guide wall 23 is spaced from the periphery of the exhaust valves 7 so that it does not close the valve openings of the exhaust valves 7, and this exhaust gas guide wall 23 extends along the diameter of the inner wall 3a of the cylinder head 3 in such a way that it extends along the periphery of the exhaust valves 7, which is located on the intake valve side, and passes through between the spark plug 10 and the exhaust valves 7.

Figure 25:
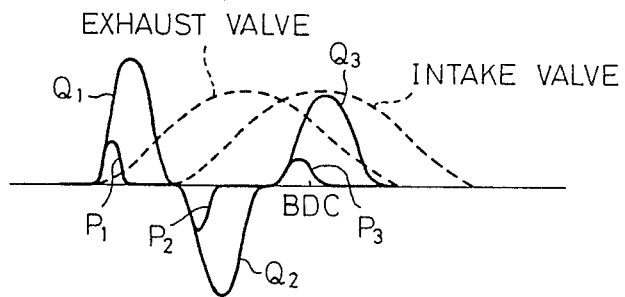
FIG. 25 is a diagram illustrating the valve lift of the intake valve and the exhaust valve and illustrating a change in pressure in the exhaust port.
Figure 26:
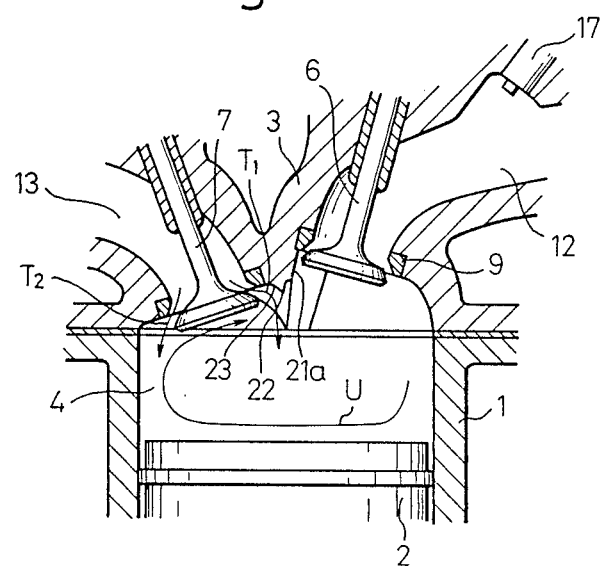
FIG. 26 is a cross-sectional side view of the engine, illustrating the operation of the engine of FIGS. 23 and 24.

As mentioned earlier, as illustrated in FIG. 25, when the engine is operating under a light load, the positive pressure $P_1$ and the vacuum pressure $P_2$ are produced in the exhaust ports 13 and, when the engine is operating under a heavy load, the positive pressure $Q_1$ and the vacuum pressure $Q_2$ are produced in the exhaust ports 13. The vacuum pressure $P_2$ and $Q_2$ propagate in the exhaust passage in the downstream direction thereof and are reflected at the joining portion of the exhaust passages for each cylinder. Subsequently, the thus reflected pressure is again propagated toward the exhaust ports 13 in the form of a positive pressure. Consequently, when the engine is operating under a light load, the positive pressure $P_3$ is produced in the exhaust ports 13 a little while before the exhaust valves 7 close, as illustrated in FIG. 25, and, when the engine is operating under a heavy load, the positive pressure $Q_3$ is produced in the exhaust ports 13 a little while before the exhaust valves 7 close, as illustrated in FIG. 25.

As mentioned earlier, when the engine is operating under a light load, the amount of fresh air fed into the combustion chamber 4 is small, and in addition, the velocity of the fresh air flowing into the combustion chamber 4 is low. As a result, the fresh air stays at the upper portion of the combustion chamber 4, and, consequently, when the piston 2 moves upward, the air-fuel mixture is collected at the upper portion of the combustion chamber 4. In addition, when the piston 2 moves upward, since the positive pressure $P_3$ is produced in the exhaust ports 13 a little while before the exhaust valves 7 close, the exhaust gas in the exhaust ports 13 flows into the combustion chamber 4. However, this positive pressure $P_3$ is low, and thus, since the exhaust gas flows into the combustion chamber 4 from the entire periphery of the exhaust valves 7 at a low speed, there is no danger that this exhaust gas causes the air-fuel mixture collected in the upper portion of the combustion chamber 4 to spread.

Conversely, when the engine is operating under a heavy load, the fresh air flows within the combustion chamber 4 at a high speed in the form of a loop. At this time, since the great positive pressure $Q_3$ is produced in the exhaust ports 13 a little while before the exhaust valves 7 close, the exhaust gas in the exhaust ports 13 flows into the combustion chamber 4 at a high speed, as illustrated by the arrows $T_1$ and $T_2$ in FIG. 26. At this time, if the exhaust gas guide wall 23 is not provided, the exhaust gas $T_1$ flows along the inner wall 3c of the cylinder head 3 toward the intake valves 6 at a high speed, the fresh air stream U swirling about a horizontal axis in the combustion chamber 4 is strengthened by the exhaust gas $T_1$ and thus swirls about the horizontal axis at a high speed. However, if the fresh air stream U swirls at a high speed, a stable and distinct boundary layer is formed between the swirling fresh air stream U and the residual exhaust gas existing at the center of the combustion chamber 4. In addition, at this time, since the swirling fresh air stream U does not spread toward the center of the combustion chamber 4, turbulence is not given to the residual exhaust gas existing at the center of the combustion chamber 4, and thus this residual exhaust gas is maintained at a high temperature. As a result, fuel components existing in the boundary layer between the fresh air stream U and the residual exhaust gas are heated by the residual exhaust gas having a high temperature. Thus, in a diesel engine, the preignition occurs in the boundary layer and, in a gasoline engine, the self-ignition occurs in the boundary layer.

However, in the embodiment illustrated in FIGS. 23 through 26, since the exhaust gas guide wall 23 is provided, the exhaust gas $T_1$ is guided by the exhaust gas guide wall 23 and thus flows toward the center of the combustion chamber 4. Consequently, since the swirling fresh air stream U is not strengthened by the exhaust gas $T_1$, but the exhaust gas $T_1$ serves to block the swirling motion of the fresh air stream U, the swirl motion of the fresh air stream U is stopped by the exhaust gas $T_1$. When the swirl motion of the fresh air stream U is stopped, the fresh air begins to spread toward the center of the combustion chamber 4, and thus the boundary layer formed between the fresh air stream U and the residual exhaust gas collapses. In addition, this boundary layer is also collapsed by the exhaust gas $T_1$. As a result, since the amount of fuel components receiving the heat from the residual exhaust gas is increased, the temperature of the fuel component is not extremely increased, and this makes it possible to prevent self-ignition from occurring.

In addition, since the fuel flowing into the combustion chamber 4 from the intake ports 12 is not pushed away toward the inner wall of the cylinder by the exhaust gas $T_1$, there is no danger that the fuel is stuck to the inner wall of the cylinder.

Figure 27:
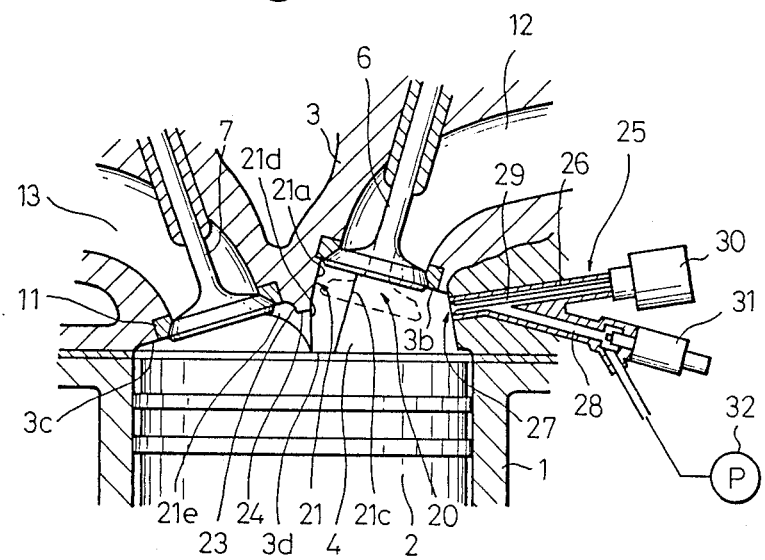
FIG. 27 is a cross-sectional side view of a still further embodiment of a two-stroke engine.
Figure 28:
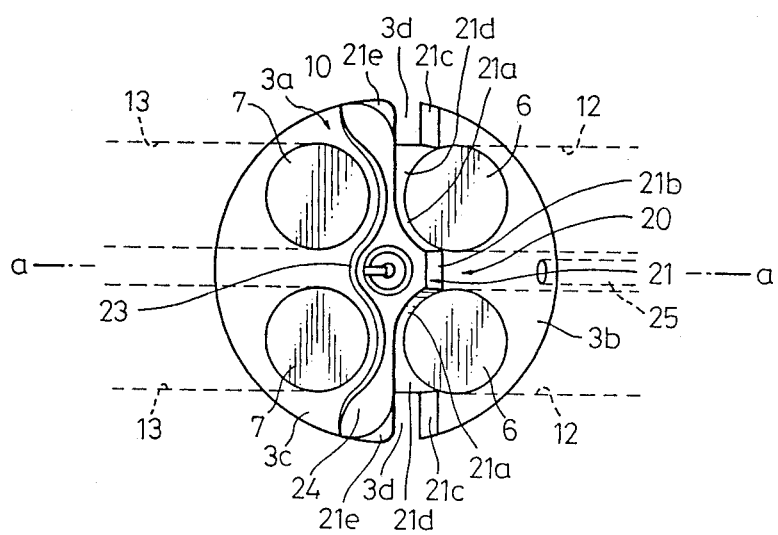
FIG. 28 is a view illustrating the inner wall of the cylinder head of FIG. 27.
Figure 29:
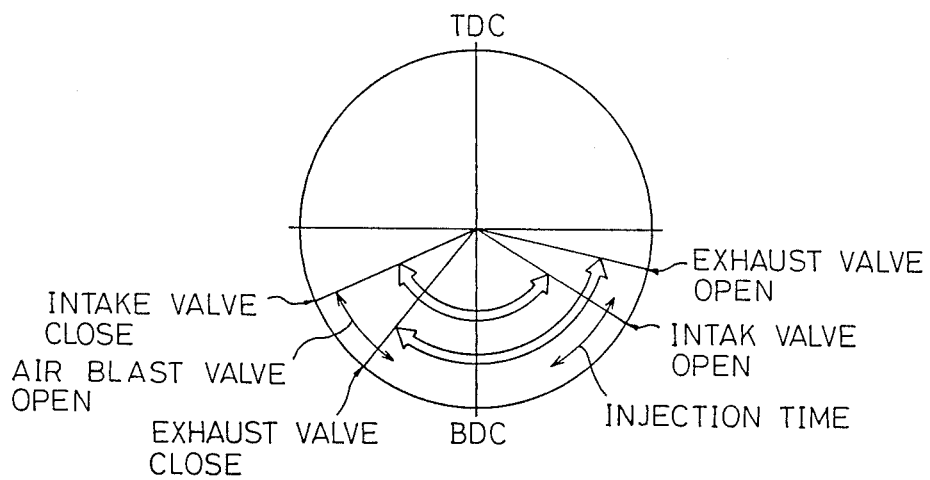
FIG. 29 is a diagram illustrating the opening time of the intake valve and the exhaust valve.

FIGS. 27 through 29 illustrate a still further embodiment. As can be seen from FIG. 28, also in this embodiment, the intake valves 6, the exhaust valves 7, the intake ports 12, the exhaust ports 13, the masking walls 21a, and the fresh air guide walls 21c are symmetrically arranged with respect to the plane a—a and have substantially the same shape, respectively.

Also in this embodiment, the exhaust gas guide wall 23 extending along the periphery of the exhaust valves 7, which is located on the intake valve side, is formed on the inner wall portion 3c of the cylinder head 3. A flat face 24 is formed between the exhaust gas guide wall 23 and the circumferential wall 21 of the depression 20, and the spark plug 10 is arranged on the flat face 24.

In addition, in this embodiment, a so-called air blast valve 25 injecting fuel together with pressurized air is arranged on the inner wall 32 of the cylinder head 3. This air blast valve 25 comprises a pressurized air passage 26 forming a nozzle opening 27 at the tip end thereof, a pressurized air passage 28 branched off from the pressurized air passage 26, a control valve 29 controlling the opening operation of the nozzle opening 27, an actuator 30 for actuating the control valve 29, and a fuel injector 31 for injecting fuel into the pressurized air passage 28. The pressurized air passage 28 is connected to a pressurized air feed pump 32, and thus the pressurized air passages 26 and 28 are filled with pressurized air. As illustrated in FIG. 29, fuel is initially injected from the fuel injector 31, and then the control valve 29, i.e., the air blast valve 25, is opened about when the intake valves 6 close. When the control valve 29, i.e., the air blast valve 25 is opened, fuel is injected into the combustion chamber 4 from the nozzle opening 27 together with pressurized air.

Also in this embodiment, when the engine is operating under a heavy load, since the exhaust gas flowing into the combustion chamber 4 from the exhaust ports 13 is guided by the exhaust gas guide wall 23 and then flows toward the center of the combustion chamber 4, the boundary layer between the swirling fresh air stream and the residual exhaust gas collapses, and thus it is possible to prevent self-ignition from occurring. In addition, since fuel injected from the air blast valve 25 is not pushed back by the exhaust gas flowing into the combustion chamber 4, there is no danger that the fuel is stuck to the inner wall of the cylinder.

The embodiments hereinbefore described indicate the case where the present invention is applied to a two-stroke gasoline engine. However, the present invention may be applied to a two-stroke diesel engine as well.

According to the present invention, the valve openings between the valve seats and the peripheral portions of the intake valves, which are located on the exhaust valve side, are masked by the corresponding masking walls for the entire time for which the intake valves are open. In addition, since the fresh air streams flowing into the combustion chamber from the intake ports have substantially the same strength, these fresh air streams flow symmetrically with respect to the plane including the axis of the cylinder in the form of a loop. As a result, a strong loop scavenging operation can be obtained.

While the invention has been described by reference to specific embodiments chosen for purposes of illustration, it should be apparent that numerous modifications could be made thereto by those skilled in the art without departing from the basic concept and scope of the invention.

We claim:

1. A two-stroke engine comprising:
   an engine body including a cylinder and a cylinder head which has an inner wall;
   a piston reciprocally movable in said engine body, the inner wall of said cylinder head and a top face of said piston defining a combustion chamber therebetween;
   a pair of intake ports formed in said cylinder head and symmetrically arranged with respect to a symmetrical plane which includes an axis of said cylinder;
   a pair of intake valves symmetrically arranged on the inner wall of said cylinder head with respect to said symmetrical plane and having substantially the same shape;
   exhaust valve means arranged on the inner wall of said cylinder head; and
   a pair of masking walls each being formed on the inner wall of said cylinder head and arranged between said corresponding intake valve and said exhaust valve means to mask a valve opening formed between a valve seat and a peripheral portion of said corresponding intake valve, which is located on said exhaust valve means side, for the entire time for which said corresponding intake valve is open, said masking walls being symmetrically arranged with respect to said symmetrical plane and having substantially the same shape.

2. A two-stroke engine according to claim 1, wherein said intake ports have substantially the same shape.

3. A two-stroke engine according to claim 1, wherein said intake valves have substantially the same valve lift curve.

4. A two-stroke engine according to claim 1, wherein said exhaust valve means comprises a pair of exhaust valves symmetrically arranged with respect to said symmetrical plane and having substantially the same shape.

5. A two-stroke engine according to claim 4, wherein said intake valves have a shape and a weight which are substantially the same as those of said exhaust valves.

6. A two-stroke engine according to claim 1, wherein each of said masking walls is arranged close to peripheral portion of said corresponding intake valve, which is located on said exhaust valve means side, and extends downward, toward said piston to a position lower than said corresponding intake valve when said corresponding intake valve is in the maximum lift position thereof.

7. A two-stroke engine according to claim 6, wherein each of said masking walls extends in an arc along the peripheral portion of said corresponding intake valve.

8. A two-stroke engine according to claim 7, wherein each of said masking walls extends along approximately one-third of the peripheral portion of said corresponding intake valve.

9. A two-stroke engine according to claim 1, wherein the inner wall of said cylinder head has a raised portion projecting downward therefrom toward said piston and extending between said intake valves and said exhaust valve means along the inner wall of said cylinder head, said raised portion having a symmetrical shape with respect to said symmetrical plane, said masking walls being formed on said raised portion.

10. A two-stroke engine according to claim 9, wherein said exhaust valve means is spaced from said raised portion.

11. A two-stroke engine according to claim 9, further comprising a spark plug arranged on the inner wall of said cylinder head on said intake valves side of said raised portion.

12. A two-stroke engine according to claim 11, wherein said raised portion has an arced central portion facing toward said exhaust valve means, and said spark plug is arranged substantially at a center of the inner wall of said cylinder head and surrounded by said central arced portion.

13. A two-stroke engine according to claim 1, wherein the inner wall of said cylinder head has a depression formed thereon and comprises a substantially flat inner wall portion other than said depression, a bottom wall of said depression, and a circumferential wall of said depression, which is located between said inner wall portion and said bottom wall, said intake valves being arranged on said bottom wall, said exhaust valve means being arranged on said inner wall portion, said masking walls being formed on said circumferential wall.

14. A two-stroke engine according to claim 13, wherein the circumferential wall of said depression extends between opposed ends of a circumferential wall of the inner wall of said cylinder head, and a portion of said circumferential wall of said depression other than said masking wall forms a fresh air guide wall extending downward toward said piston.

15. A two-stroke engine according to claim 14, wherein said fresh air guide wall comprises a first guide wall located between said intake valves and second guide walls located between the circumferential wall of the inner wall of said cylinder head and said intake valves.

16. A two-stroke engine according to claim 15, wherein said first guide wall and said second guide walls are located in substantially the same plane which extends substantially in parallel to a line passing through said intake valves.

17. A two-stroke engine according to claim 15, wherein said second guide walls extend in parallel to the axis of said cylinder.

18. A two-stroke engine according to claim 17, wherein said first guide wall extends in parallel to the axis of said cylinder.

19. A two-stroke engine according to claim 15, wherein said second guide walls are inclined and extend toward an inner wall of said cylinder beneath said intake valves.

20. A two-stroke engine according to claim 19, wherein said first guide wall is inclined and extends toward the inner wall of said cylinder beneath said intake valves.

21. A two-stroke engine according to claim 15, wherein said second guide walls have a height which is higher than that of said masking walls.

22. A two-stroke engine according to claim 21, wherein said cylinder head has a lowermost wall having lowermost wall portions which project toward said combustion chamber, and said second guide walls extend to said corresponding lowermost wall portions.

23. A two-stroke engine according to claim 22, wherein curved walls for guiding unburned gas are formed on the inner wall of said cylinder head at a position opposite to said corresponding second guide walls with respect to said corresponding lowermost wall portions and extend from the inner wall of said cylinder head around said exhaust valve means to said corresponding lowermost wall portions.

24. A two-stroke engine according to claim 21, wherein said masking walls have a height which is gradually increased toward said corresponding second guide walls.

25. A two-stroke engine according to claim 13, further comprising a spark plug arranged on said inner wall portion approximately at a center of the inner wall of said cylinder head.

26. A two-stroke engine according to claim 1, wherein an exhaust gas guide wall projecting toward said combustion chamber and spaced from said exhaust valve means is formed on the inner wall of said cylinder head between said exhaust valve means and said masking walls.

27. A two-stroke engine according to claim 26, wherein said exhaust gas guide wall extends along a periphery of said exhaust valve means, which is located on said masking walls side.

28. A two-stroke engine according to claim 26, wherein said exhaust gas guide wall has a height which is less than one half of the amount of maximum lift of said exhaust valve means.

29. A two-stroke engine according to claim 26, wherein a raised portion is formed between said exhaust gas guide wall and said masking walls and has a flat face formed thereon, and a spark plug is arranged on the flat face of said raised portion.

30. A two-stroke engine according to claim 1, wherein said exhaust valve means opens earlier than said intake valves and closes earlier than said intake valves.

31. A two-stroke engine according to claim 1, wherein a fuel injector is arranged in at least one of said intake ports.

32. A two-stroke engine according to claim 31, wherein fuel is injected from said fuel injector toward a portion of a rear face of a valve body of said intake valve, which portion is located on the opposite side of said masking walls.

33. A two-stroke engine according to claim 32, wherein said fuel has a bar-like shape having a small spread angle.

34. A two-stroke engine according to claim 31, wherein fuel is injected from said fuel injector after said intake valve opens and before said piston reaches bottom dead center.

35. A two-stroke engine according to claim 1, wherein an injector is arranged in said combustion chamber to inject fuel together with pressurized air.

36. A two-stroke engine according to claim 35, wherein said injector comprises a nozzle opening connected to a pressurized air source via a pressurized air passage, a control valve controlling the opening operation of said nozzle opening, and a fuel injector for injecting fuel into said pressurized air passage.

37. A two-stroke engine according to claim 35, wherein the injection of the fuel and the pressurized air is started about when said intake valves close.

* * * * *